…

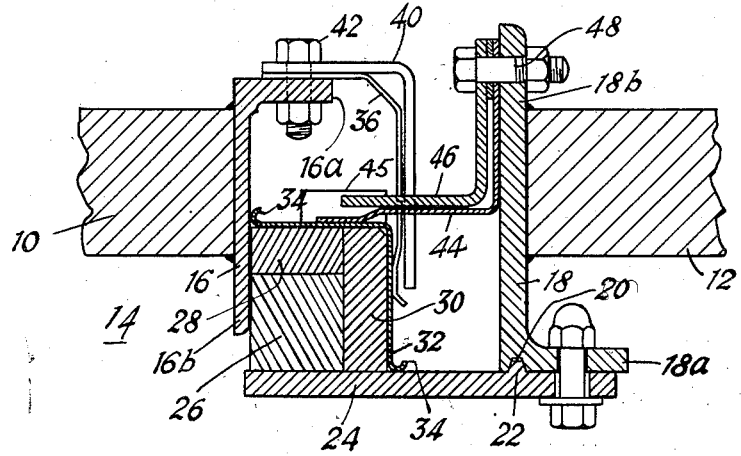
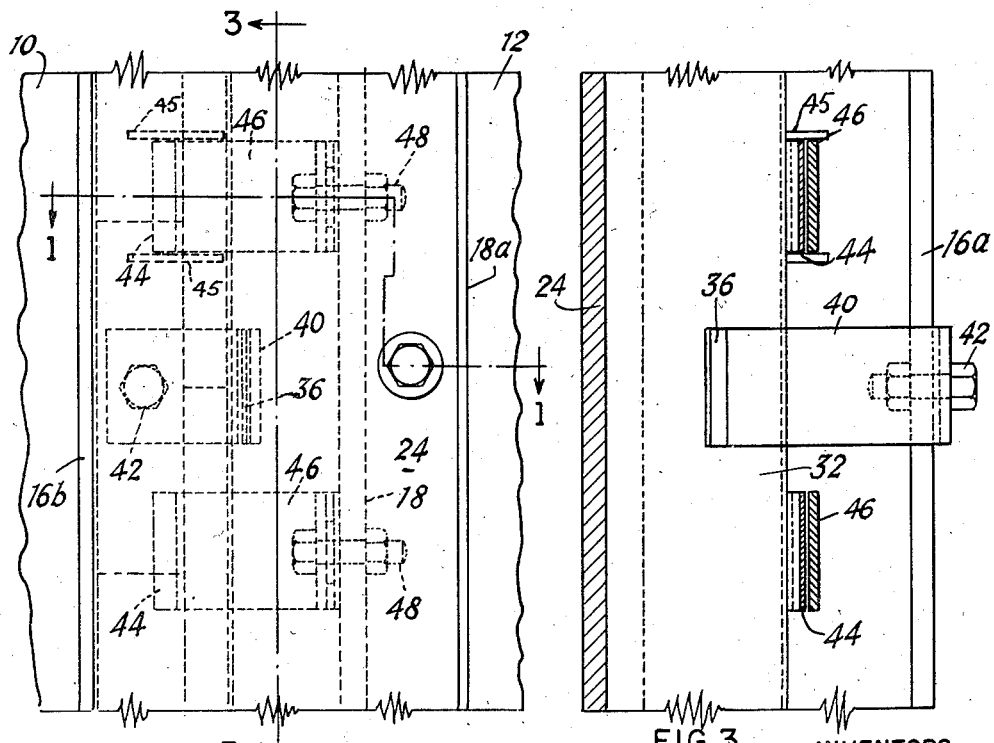

United States Patent Office 2,789,670
Patented Apr. 23, 1957

2,789,670
SLIDING BLOCK SEAL

Cecil H. Gay, Akron, and Glen J. Schoessow and Earl E. Schoessow, Barberton, Ohio, assignors to The Babcock & Wilcox Company, Rockleigh, N. J., a corporation of New Jersey Application September 10, 1951, Serial No. 245,844

7 Claims. (Cl. 189—34)

The present invention relates to an improved sliding block seal construction adapted for use between structural members having a relative movement under varying operating conditions, and more particularly to a construction of the character described in which a substantially gas-tight seal is required for a high gas pressure differential.

In various industrial constructions wherein a substantial pressure differential exists between a gas contained within the structure and the external atmosphere, a differential movement may occur between adjoining walls due to differences in thermal growth of different portions of the structure in operation, or differences in thermal expansion and contraction due to differences in thermal conditions to which the walls are subjected. In accordance with the invention, a sliding block seal is provided between such walls which will permit a predetermined relative movement of the walls in any direction, while retaining a substantially gas-tight seal between the differentially moving walls. The sliding block seal provided herein is particularly designed for field assembly of the associated structural members and field assembly of the seal itself. The seal comprises a plurality of blocks having a sliding contact with the relatively moving structural members, and so relatively arranged as to minimize escape of gas through the seal.

The various features of novelty which characterize the invention are pointed out with particularity in the claims annexed to and forming a part of this specification. For a better understanding of the invention, its operating advantages and specific objects attained by its use, reference should be had to the accompanying drawings and descriptive matter in which we have illustrated and described a preferred embodiment of our invention.

Of the drawings:

Fig. 1 is a horizontal section of a vertical wall construction embodying the invention, taken on the line 1—1 of Fig. 2;

Fig. 2 is an elevation of the structure shown in Fig. 1; and

Fig. 3 is a vertical section taken on the line 3—3 of Fig. 2.

In the drawings the invention has been illustrated as used between vertical metallic wall members 10 and 12 forming part of the enclosing walls for a space 14 in which a substantial superatmospheric pressure is maintained. In operation the walls 10 and 12 are designed to have a differential movement in all directions due to differences in temperature conditions to which they are subjected and thermal growth of the associated structure within the space 14.

In the field assembly of the walls and a sliding block seal embodying the invention, the vertical wall 10 has welded thereto along one vertical edge thereof an angle plate member 16 extending the full height of the wall 10. The plate member 16 is arranged with its short flange 16$^a$ at the outer side of the wall 10 and extending towards the wall 12, and its long flange 16$^b$ projecting beyond the inner side of the wall 10. The inner surface of the flange 16$^b$ is machined to provide an uninterrupted vertical sliding surface for the sealing blocks hereinafter described. The adjacent vertical edge of the wall 12 is also provided with an angle plate member 18 welded thereto. The short flange 18$^a$ of the plate is positioned at the inner side of the wall 12 and arranged parallel thereto, while the long flange 18$^b$ of the plate projects beyond the outer side of the wall 12. The plate flange 18$^a$ is provided with a groove 20 extending the full length thereof and arranged to receive a correspondingly shaped tongue 22 formed on a sectional plate 24. The plate 24 is formed by a vertical series of plate sections with adjacent sections having a shiplap joint therebetween and with each section bolted to the plate flange 18$^a$. The outer surface of the sectioned plate 24 is machined to serve as a vertical plane surface for the seal blocks hereinafter described. With this arrangement of the parts, the walls 10 and 12 will thus have vertical plate extensions 16 and 24 providing sliding surfaces in vertical planes at right angles to one another, with the adjoining edges of the plates 16 and 24 spaced apart a predetermined distance sufficient to permit the maximum relative movement in that direction contemplated under the designed operating conditions.

The gas sealing members preferably consist of an assembly of blocks of rectangular horizontal cross-section relatively arranged in a square formation to provide a sliding contact with the machined surfaces of the plates 16 and 24 and to minimize the leakage of gas between the blocks and contacted plate surfaces and through the various block joints. As shown, the sealing blocks are of different cross-sectional area and of different short lengths to compensate for any irregularity along the length of the contacted plate surfaces, and to provide staggered interblock joints between the several series of blocks. In the construction illustrated, the sealing block assembly consists of a vertical series of blocks 26 of square horizontal cross-section machined to provide uninterrupted vertical surfaces in contact with the plates 16 and 24, and with a portion of the first side exposed to the interior of the space 14. Along one outer side of the blocks 26 is a second vertical series of rectangular blocks 28, one short side of which is in sliding contact with the plate 16. A third vertical series of blocks 30 is positioned along the remaining side of the blocks 26 and the other short side of the blocks 28, with one short side of each block 30 contacting with the sliding surface of the plate 24. Each vertical series of sealing blocks has its interblock horizontal joints staggered relative to both of the remaining series of blocks so that each joint between the blocks 26 is covered at its outer ends by portions of the blocks 28 and 30. For example, in one installation the blocks 26 were 2¼" x 2¼" x 6", the blocks 28 2¼" x 1" x 12", while the blocks 30 were 3¼" x 1" x 12", and arranged in a square formation as shown in Fig. 2, so that each interblock joint is sealed by blocks of both the remaining series. The sealing blocks may be made of any suitable machinable material capable of withstanding the temperature conditions within the space 14 and of maintaining the desired sliding contact with the wall plates. Soapstone, graphite and similar materials are preferred for the block material because of their machinability and self-lubricating qualities.

The blocks 26, 28 and 30 are confined in their assembled position by a flexible metallic sectional angle cover 32 which extends the full length of the wall, and forms a secondary seal for the joint. The cover sections are made in relatively short lengths to avoid thermal expansion difficulties and the side edges of each cover section are formed by curved flanges 34 arranged to contact with the surfaces of the wall plates 16 and 24. Angle strips are welded to the ends of alternate sections at the outer side thereof to permit overlapping of the adjacent section end portions. The cover sections 32 are resiliently held in position by bent spring clips 36 mounted at spaced points along the flange 16ᵃ and slideably engaging the side of the cover sections contacting with the long side of the blocks 30. The clips 36 are constructed and bent to provide extended areas of sliding contact with the cover sections 32, as indicated in Fig. 1. Lateral movement of the cover contacting portion of the clips 36 is limited by corresponding angle stop members 40 vertically coextensive and held in position at spaced points on the flange 16ᵃ, along with the spring clips 36, by bolts 42. The portions of the cover sections contacting with the outer short side of the blocks 30 and outer long side of the blocks 28 are resiliently held in position by bent spring clips 44 mounted on and vertically spaced along the flange 18ᵇ. A pair of spaced guide lugs 45 are welded to the center cover section at the outer side thereof and along opposite sides of the corresponding spring clip 44 to prevent thermal expansion of the cover from moving the associated seal blocks. Outward movement of the spring clips 44 is limited by corresponding angle stop members 46 vertically coextensive with the corresponding spring clips 44 and also held on the flange 18ᵇ by the bolts 48.

With the described arrangement a limited differential movement in any direction between the walls 10 and 12 and corresponding plates 16 and 24 has been found to be permissible without affecting the efficiency of the sliding seal therebetween, even under a gas pressure differential as high as 90 inches H₂O between the space 14 and exterior of the structure. The gas pressure assists the block sealing action with the structure described. On any differential wall movement the plate 16 or plate 24, or both, will be moved in sliding contact with the corresponding block surfaces. The blocks are held in their assembled positions relative to the plates by the angle cover sections 32 and the spring clips 36 and 44 acting thereon in directions at right angles to one another and in sliding contact with the angle cover sections. The rigid stop members 40 and 46 effectively limit the movement of the parts in directions normal thereto.

The sliding block seal construction described has relatively few parts and is readily adapted to field assembly. Any irregularities in the wall plates due to field welding are compensated by the short lengths of sealing blocks employed, and particularly of the blocks 26 which have the major area in contact with the plates. Wear on the blocks will be negligible and in any event will be effectively compensated by the resilient construction of the sealing block holding means.

While in accordance with the provisions of the statutes we have illustrated and described herein the best form of the invention now known to us, those skilled in the art will understand that changes may be made in the form of the apparatus disclosed without departing from the spirit of the invention covered by the claims, and that certain features of the invention may sometimes be used to advantage without a corresponding use of other features.

We claim:

1. In combination with a pressure retaining wall structure having a pair of adjacent pressure wall members subject to movement relative to each other in planes parallel to the length, width and breadth, a sliding block seal comprising a plate on one of said members, a plate on the other member in a plane substantially at right angles to the plane of said first named plate, a sealing block of rectangular horizontal cross-section having sides in sliding contact with both of said plates, a second sealing block of rectangular horizontal cross-section extending along and contacting with an outer side of said first named block and having one side in sliding contact with said first named plate, a third sealing block of rectangular horizontal cross-section extending along and contacting with an outer side of said first block and contacting said second named blocks and having one side in sliding contact with said second named plate, said seal blocks being of a relatively hard material, and means holding said blocks in their assembled operative position.

2. In combination with a pressure retaining wall structure having a pair of adjacent pressure wall members subject to movement relative to each other in planes parallel to the length, width and breadth, a sliding block seal comprising a plate on one of said members, a plate on the other member in a plane substantially at right angles to the plane of said first named plate, a series of sealing blocks having sides in sliding contact with both of said plates, a second series of sealing blocks extending along and contacting with an outer side of said first named blocks and having one side in sliding contact with said first named plate, a third series of sealing blocks extending along and contacting with an outer side of said first block and contacting said second named blocks and having one side in sliding contact with said second named plate, said seal blocks being of a relatively hard material, and means resiliently holding said blocks in assembled position.

3. In combination with a pressure retaining wall structure having a pair of adjacent pressure wall members subject to movement relative to each other in planes parallel to the length, width and breadth, a sliding block seal comprising a vertical plate on one of said members, a vertical plate on the other member in a plane substantially at right angles to the plane of said first named plate, a vertical series of sealing blocks of rectangular horizontal cross-section having sides in sliding contact with both of said plates, a second vertical series of sealing blocks of rectangular horizontal cross-section extending along and contacting with an outer side of said first named blocks and having one side in sliding contact with said first named plate, a third vertical series of sealing blocks of rectangular horizontal cross-section extending along and contacting with an outer side of said first block and contacting said second named blocks and having one side in sliding contact with said second named plate, said seal blocks being of a relatively hard material, and means resiliently holding said blocks in assembled position.

4. In combination with a pressure retaining wall structure having a pair of adjacent pressure wall members subject to movement relative to each other in planes parallel to the length, width and breadth, a sliding block seal comprising a vertical plate on one of said members, a vertical plate on the other member in a plane substantially at right angles to the plane of said first named plate, a sealing block of rectangular horizontal cross-section having sides in sliding contact with both of said plates, a second sealing block of rectangular horizontal cross-section extending along and contacting with an outer side of said first named block and having one side in sliding contact with said first named plate, a third sealing block of rectangular horizontal cross-section extending along and contacting with an outer side of said first block and contacting said second named blocks and having one side in sliding contact with said second named plate, an angle cover member extending over the outer sides of said second and third named blocks, said seal blocks being of a relatively hard material, and means holding said cover member and blocks in their assembled operative position.

5. In combination with a pressure retaining wall structure having a pair of adjacent pressure wall members subject to movement relative to each other in planes parallel to the length, width and breadth, a sliding block seal comprising a vertical plate on one of said members, a vertical plate on the other member in a plane substantially at right angles to the plane of said first named plate, a sealing block having sides in sliding contact with both of said plates, a second sealing block extending along and contacting with an outer side of said first named block and having one side in sliding contact with said first named plate, a third sealing block extending along and contacting with an outer side of said first block and contacting said second named blocks and having one side in sliding contact with said second named plate, an angle cover member extending over the outer sides of said second and third named blocks, said seal blocks being of a relatively hard material, and means holding said cover member and blocks in assembled position comprising spring means mounted on said structural members and arranged to resiliently press on said cover member in sliding contact therewith and in directions at right angles to one another.

6. In combination with a pressure retaining wall structure having a pair of adjacent pressure wall members subject to movement relative to each other in planes parallel to the length, width and breadth, a sliding block seal comprising a vertical plate on one of said members, a vertical plate on the other member in a plane substantially at right angles to the plane of said first named plate, a vertical series of sealing blocks of rectangular horizontal cross-section having sides in sliding contact with both of said plates, a second vertical series of sealing blocks of rectangular horizontal cross-section extending along and contacting with an outer side of said first named blocks and having one side in sliding contact with said first named plate, a third vertical series of sealing blocks of rectangular horizontal cross-section extending along and contacting with an outer side of said first block and contacting said second named blocks and having one side in sliding contact with said second named plate, a sectional angle cover extending over the outer sides of said second and third named block series, said seal blocks being of a relatively hard material, and means holding said cover sections and blocks in assembled position comprising bent spring clips mounted on said structural members and arranged to resiliently press on said cover sections in sliding contact therewith and in directions at right angles to one another.

7. In combination with a pressure retaining wall structure having a pair of adjacent pressure wall members subject to movement relative to each other in planes parallel to the length, width and breadth, a sliding block seal comprising a vertical plate on one of said members, a vertical plate on the other member in a plane substantially at right angles to the plane of said first named plate, a vertical series of sealing blocks of rectangular horizontal cross-section having sides in sliding contact with both of said plates, a second vertical series of sealing blocks of rectangular horizontal cross-section extending along and contacting with an outer side of said first named blocks and having one side in sliding contact with said first named plate, a third vertical series of sealing blocks of rectangular horizontal cross-section extending along and contacting with an outer side of said first block and contacting said second named blocks and having one side in sliding contact with said second named plate, an angle cover member extending over the outer sides of said second and third named block series, said seal blocks being of a relatively hard material, means holding said cover member and blocks in assembled position comprising bent spring clips mounted on said structural members and arranged to resiliently press on said cover member in sliding contact therewith and in directions at right angles to one another, and stop members mounted on said structural members and arranged to limit the outward movement of said spring clips.

References Cited in the file of this patent

UNITED STATES PATENTS 1,937,186     Barrett _____ Nov. 28, 1933